United States Patent
Wang

(10) Patent No.: US 8,427,972 B2
(45) Date of Patent: *Apr. 23, 2013

(54) RESOURCE ALLOCATION IN VIRTUAL ROUTERS

(75) Inventor: Yang Wang, Vienna, VA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 248 days.

This patent is subject to a terminal disclaimer.

(21) Appl. No.: 12/839,445

(22) Filed: Jul. 20, 2010

(65) Prior Publication Data
US 2011/0016215 A1    Jan. 20, 2011

Related U.S. Application Data

(63) Continuation of application No. 10/084,917, filed on Mar. 1, 2002, now Pat. No. 7,801,155.

(51) Int. Cl.
*H04L 12/56* (2006.01)
*H04J 1/16* (2006.01)

(52) U.S. Cl.
USPC ............ 370/252; 370/389; 370/392; 370/400

(58) Field of Classification Search ............. 370/252, 370/389, 400, 392
See application file for complete search history.

(56) References Cited

U.S. PATENT DOCUMENTS

| | | | |
|---|---|---|---|
| 6,609,153 B1 | 8/2003 | Salkewicz | |
| 6,687,220 B1 | 2/2004 | Ayres | |
| 2002/0062344 A1 | 5/2002 | Ylonen et al. | |
| 2002/0099849 A1 | 7/2002 | Alfieri et al. | |
| 2002/0169987 A1* | 11/2002 | Meushaw et al. | 713/201 |
| 2002/0198974 A1 | 12/2002 | Shafer | |
| 2003/0051048 A1 | 3/2003 | Watson et al. | |
| 2003/0210686 A1 | 11/2003 | Terrell et al. | |
| 2004/0260825 A1 | 12/2004 | Agarwal et al. | |
| 2009/0109959 A1* | 4/2009 | Elliott et al. | 370/352 |
| 2011/0258325 A1* | 10/2011 | Benfield et al. | 709/226 |

* cited by examiner

Primary Examiner — John Pezzlo

(57) ABSTRACT

A router system implements a plurality of virtual routers. Various combinations of resources may be shared by the router system when implementing the virtual routers. In one embodiment, the particular combination of resources to share when implementing the virtual router is user programmable.

20 Claims, 15 Drawing Sheets

RESOURCE ALLOCATION IN VIRTUAL ROUTERS

This application is a continuation of U.S. patent application Ser. No. 10/084,917, filed Mar. 1, 2002, now U.S. Pat. No. 7,801,155 which is incorporated herein by reference.

BACKGROUND OF THE INVENTION

A. Field of the Invention

The present invention relates generally to network data routing and, more particularly, to high performance network routing systems.

B. Description of Related Art

Routers are devices that direct traffic flow through networks. In particular, routers receive data packets, determine the next network point to which the packets should be forwarded, and then transmit the packets to the determined next network point.

In general, routers can be classified into a number of categories based on their traffic handling capacity or logical function. Backbone routers, for example, are high-performance routers that are typically implemented at the endpoints of high-capacity network links. In the context of the Internet, for example, backbone routers may be implemented at connection points of high-capacity optical links. Regional routers, in contrast, may be implemented as mid-range routers, having a routing capacity at a level below the backbone routers. Edge routers are lower capacity routers than the regional routers and are usually implemented at edges of an Internet Service Provider (ISP). The edge router controls packet transfer from the customer network or with other networks of the ISP. Edge routers are sometimes referred to as boundary routers. In general, the backbone, regional, and edge routers together provide traffic aggregation and management.

FIG. 1 is a diagram illustrating the inter-connection of a number of routers in a network. Backbone routers 110 interface with a network backbone, such as an optical backbone of the Internet. Backbone routers 110 may connect to regional routers 120. Regional routers 120 further connect to edge routers 130. Backbone routers 110, regional routers 120, and edge routers 130 may together implement a point-of-presence (POP) 100 for a network, such as the Internet. Each router within POP 100 has a unique address, such as a unique Internet Protocol (IP) address.

POPs are frequently owned by Internet Service Providers (ISPs) and are used to provide network access to the customers of the ISP. One disadvantage in the configuration of POP 100 is that the routers of POP 100 use a number of ports to communicate with one another. For example, as illustrated, each of backbone routers 110 uses two ports, one for each communication line shown in FIG. 1, to communicate with regional routers 120. Similarly, regional routers 120 use two ports to communicate with backbone routers 110.

Routers may use line cards to physically implement data transmission/reception at ports of the routers. Line cards, however, can be relatively expensive components. Accordingly, interconnecting routers 110, 120, and 130 at POP 100 can be a relatively expensive endeavor.

Accordingly, there is a need in the art to more efficiently implement the functionality of multiple routers within a single ISP or POP.

SUMMARY OF THE INVENTION

Systems and methods consistent with the principles of this invention address this and other needs by providing a router system that includes multiple virtual routers that share resources.

One aspect of the present invention is directed to a routing system that includes a number of routing resources. Additionally, a group of virtual routers are implemented by sharing selected ones of the routing resources of the routing system.

A second aspect of the invention is directed to a network POP. The POP includes a physical router system having a group of resources. Additionally, the POP includes at least one backbone router implemented as a virtual router by the physical router system and at least one regional router implemented as a virtual router by the physical router system. The backbone virtual router and the regional virtual router share resources of the physical router system.

A third aspect consistent with the invention is directed to a method that includes allocating a first set of resources as shared resources and allocating a second set of resources as non-shared resources. Further, the method includes implementing a group of virtual routers based on a sharing of resources from the first set of resources between the virtual routers and based on independently assigning resources of the second set of resources to the virtual router.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

A router system, as described herein, includes a number of logically separated "virtual" routers that may perform the functions of traditional backbone routers, regional routers, and/or edge routers. The virtual routers of a single physical router may appear to the outside world as a number of traditional physical routers. The single physical router, in implementing the virtual routers, shares physical and logical resources that would traditionally be independently implemented by each of the virtual routers. The manner in which the physical and logical resources are shared may be a user programmable feature of the router.

EXEMPLARY SYSTEM

Figure 2:
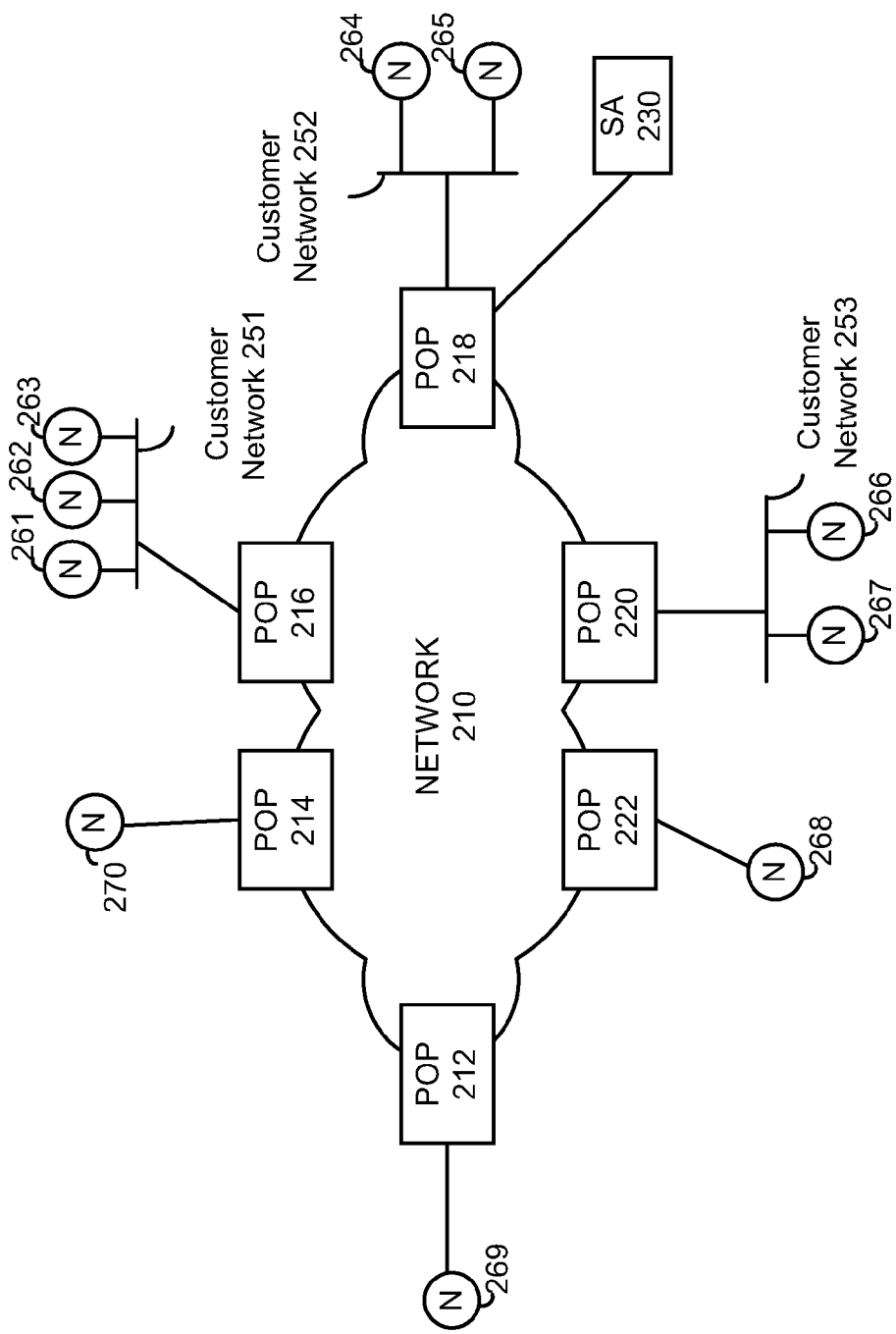
FIG. 2 illustrates an exemplary network in which systems and methods, consistent with the present invention, may be implemented.

FIG. 2 illustrates an exemplary system 200 in which systems and methods, consistent with the present invention, may be implemented. In FIG. 2, system 200 includes a network 210, points of presence (POPs) 212-222, a system administrator (SA) device 230, and a group of nodes 261-270 that may be directly connected to a POP 212-222 or connected via a customer network 251-253.

System 200 may include, for example, the Internet, an intranet, a local area network (LAN), a metropolitan area network (MAN), a wide area network (WAN), or the like. In fact, system 200 may include any type of network or combination of networks that permits routing of information from a particular source to a particular destination.

The POPs 212-222 may include a number of routers that decide, based on routing protocols (e.g., Interior Gateway Protocol and/or Exterior Gateway Protocol) and routing tables, how and where to send packets of information. Each POP 212-222 may also include one or more servers, such as an e-mail server or a World Wide Web server. Each POP 212-222 may be implemented via hardware and/or software. Consistent with aspects of the invention, and as will be described in more detail below, POPs 212-222 may be implemented using a router system that includes a number of virtual routers.

The SA device 230 may include any type of computer system, such as a mainframe, minicomputer, or personal computer, capable of connecting to the network 210 to communicate with other devices, such as a POPs 212-222, in the system 200. The SA device 230 may connect to a POP, such as POP 218, via a wired, wireless, or optical connection.

The customer networks 251-253 may include any type of local network, such as a LAN, MAN, WAN, or the like, that permits routing of information packets among the nodes connected to the respective network. These local networks may connect to edge routers of POPs 212-222 through special routers called customer premise equipments (CPEs). The nodes 261-270 may include computers, such as workstations and servers, or any other type of device that has a network interface card (NIC), such as a printer or modem. Moreover, the nodes 261-270 may include devices, such as a personal digital assistant, that connect to a particular local network via a wireless connection.

The number of components illustrated in FIG. 2 is provided for simplicity. In practice, a typical system 200 may include a larger or smaller number of networks, POPs, SA devices, customer networks, and/or nodes.

Virtual Router

Figure 1:
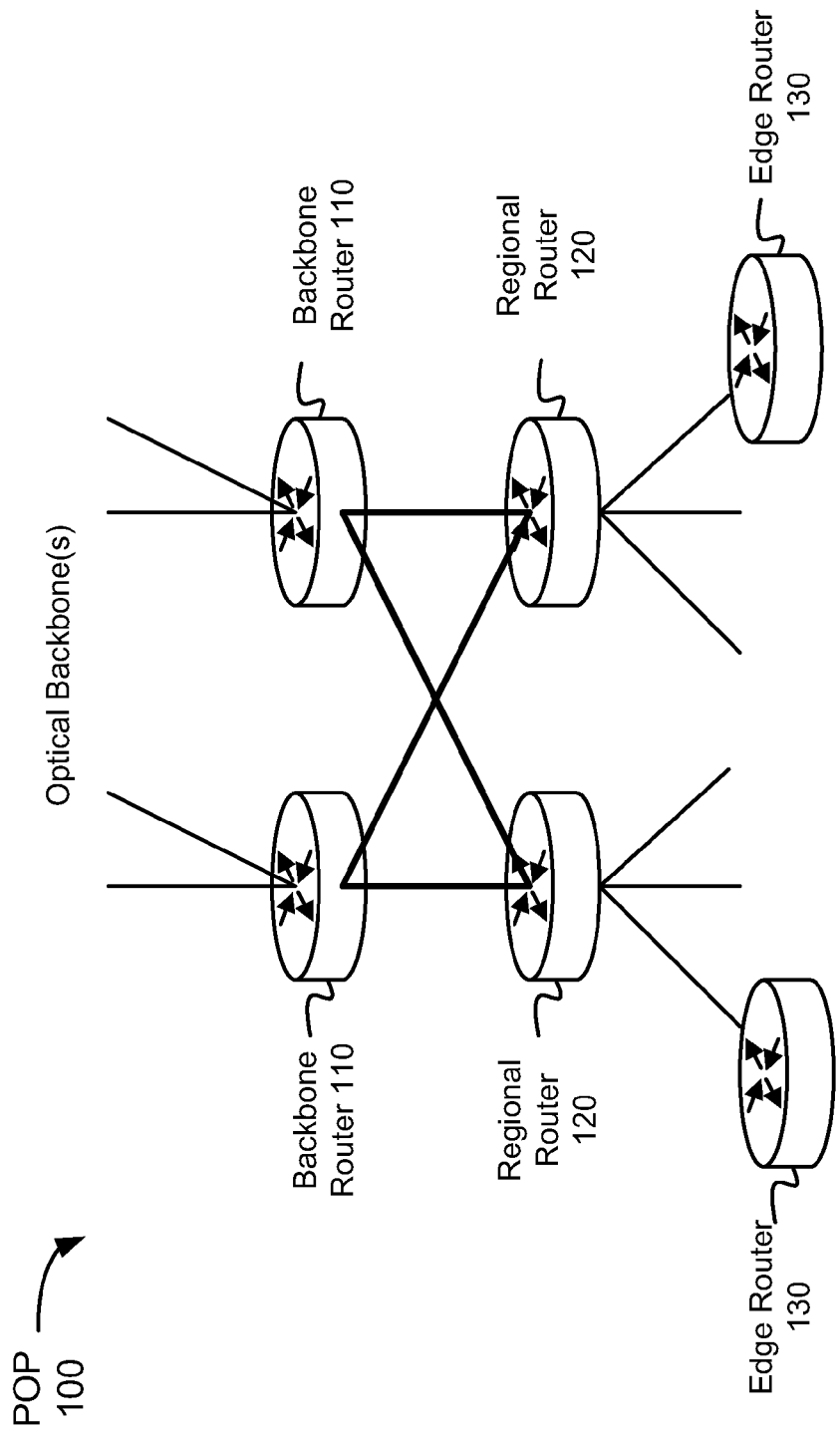
FIG. 1 is a diagram illustrating the inter-connection of a number of routers in a network.
Figure 3:
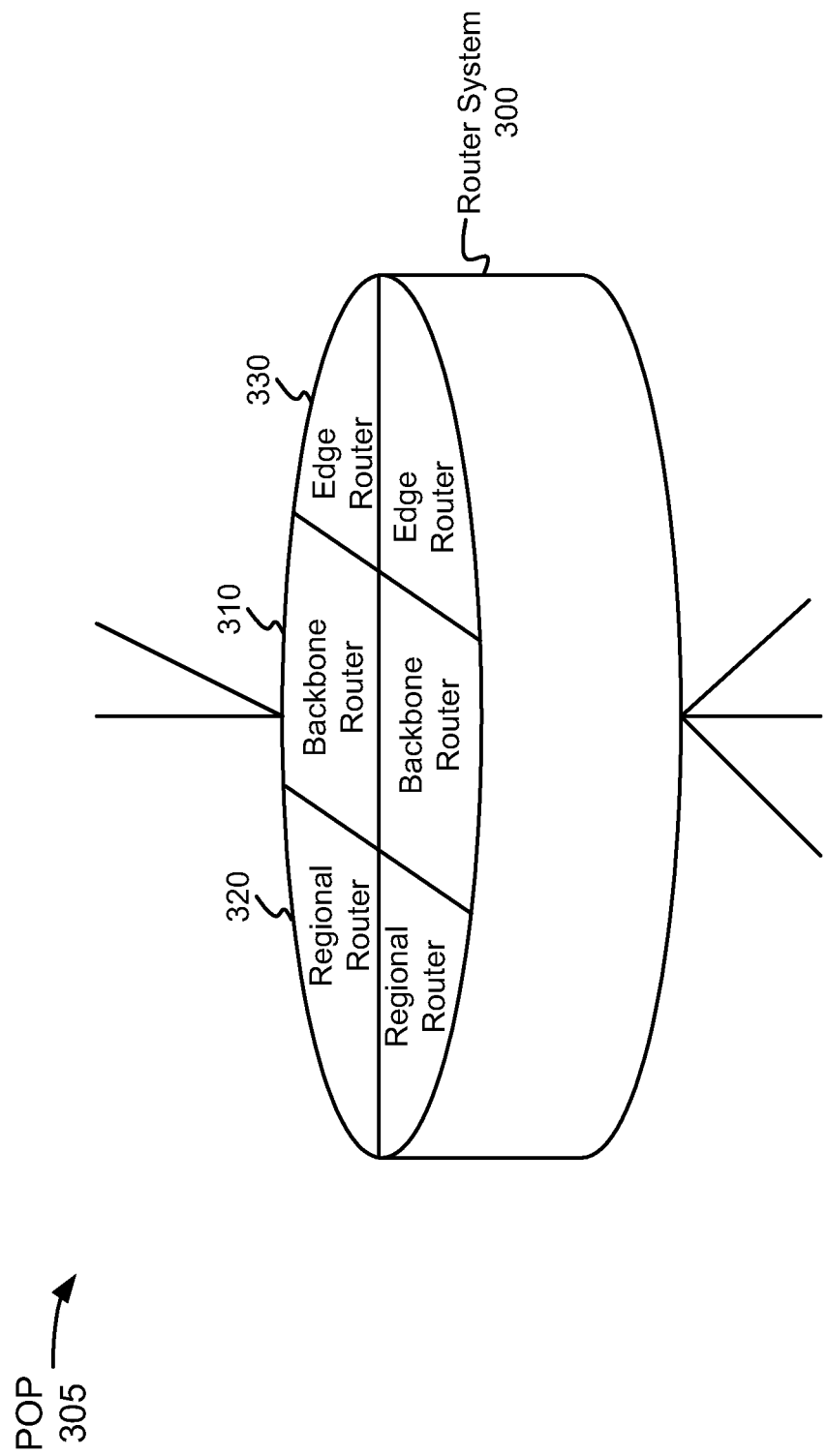
FIG. 3 is a diagram illustrating an arrangement of virtual routers in an implementation consistent with the present invention.

FIG. 3 is a diagram illustrating an exemplary router system 300 that includes six logically separated functional (virtual) routers in a POP 305. The virtual routers include backbone routers 310, regional routers 320, and edge routers 330. Functionally, routers 310, 320, and 330 operate as independent routers. Thus, from the point of view of an entity outside of POP 305, the routers 310, 320, and 330 may appear equivalent to the routers 110, 120, and 130 (FIG. 1). However, because these virtual routers are implemented within a single router system, resources of router system 300 may be allocated to multiple virtual routers.

Although router system 300 is shown as a single physical router system, in other implementations, multiple physical routers may together implement a number of virtual routers. For example, two physical routers, each implementing three virtual routers and communicating with the other physical router through traditional router ports, may be used instead of the single router.

Figure 4:
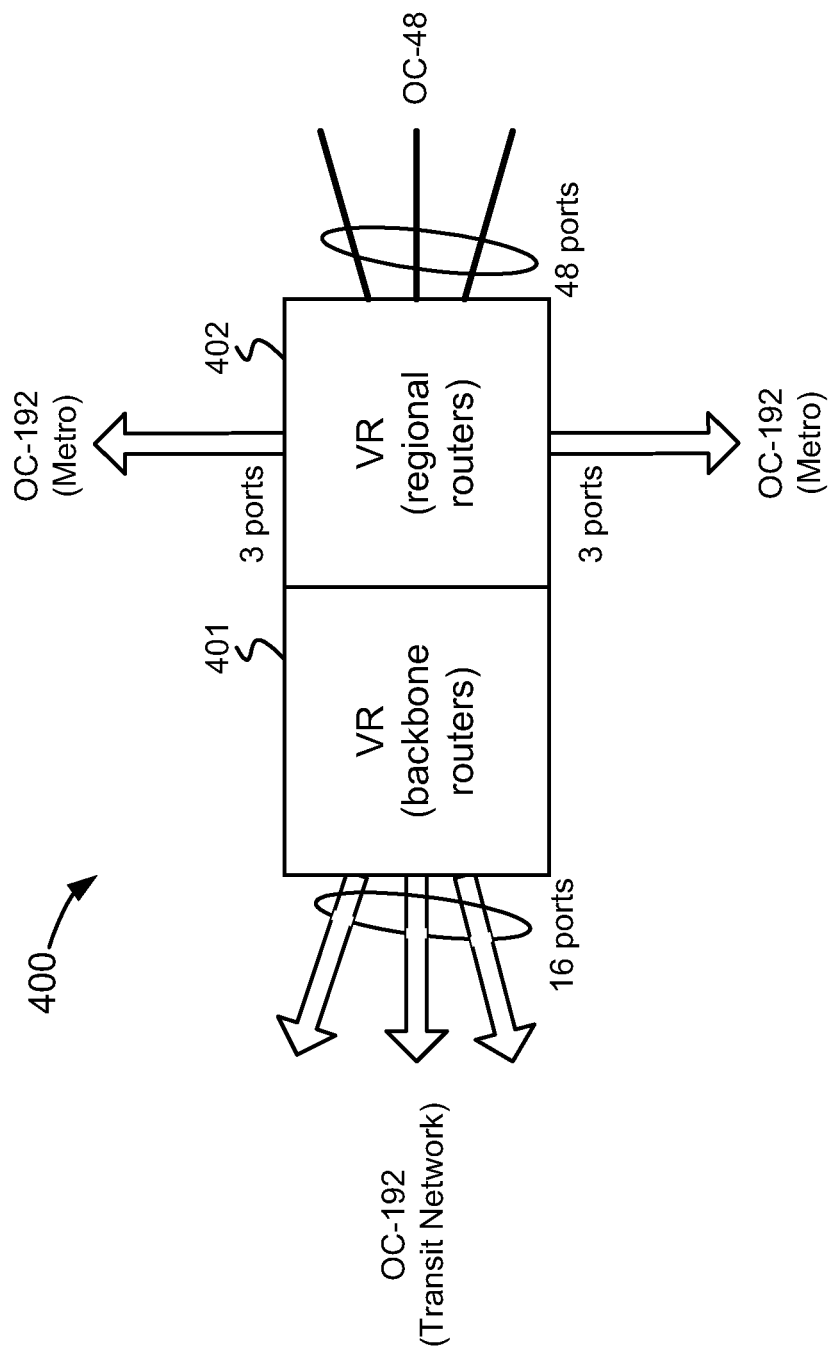
FIG. 4 is a diagram illustrating a second arrangement of virtual routers in an implementation consistent with the present invention.

FIG. 4 is a diagram illustrating another exemplary router system 400 that includes virtual routers (VRs). In FIG. 4, router system 400 implements two virtual routers. VR 401 performs the functionality of backbone routers 310 and VR 402 performs the functionality of regional routers 320.

A number of output ports are shown associated with router system 400. As shown, 16 OC-192 ports connect VR 401 to a transmit network, such as backbone links in the Internet. Six OC-192 ports connect VR 402 to metropolitan area networks, and 48 OC-48 ports connect VR 402 to edge routers. The OC port speed refers to the well known synchronous optical network (SONET) transmission standard. OC-192 transmits at 10 Gbps and OC-48 transmits at 2.488 Gbps.

Router System

Figure 5:
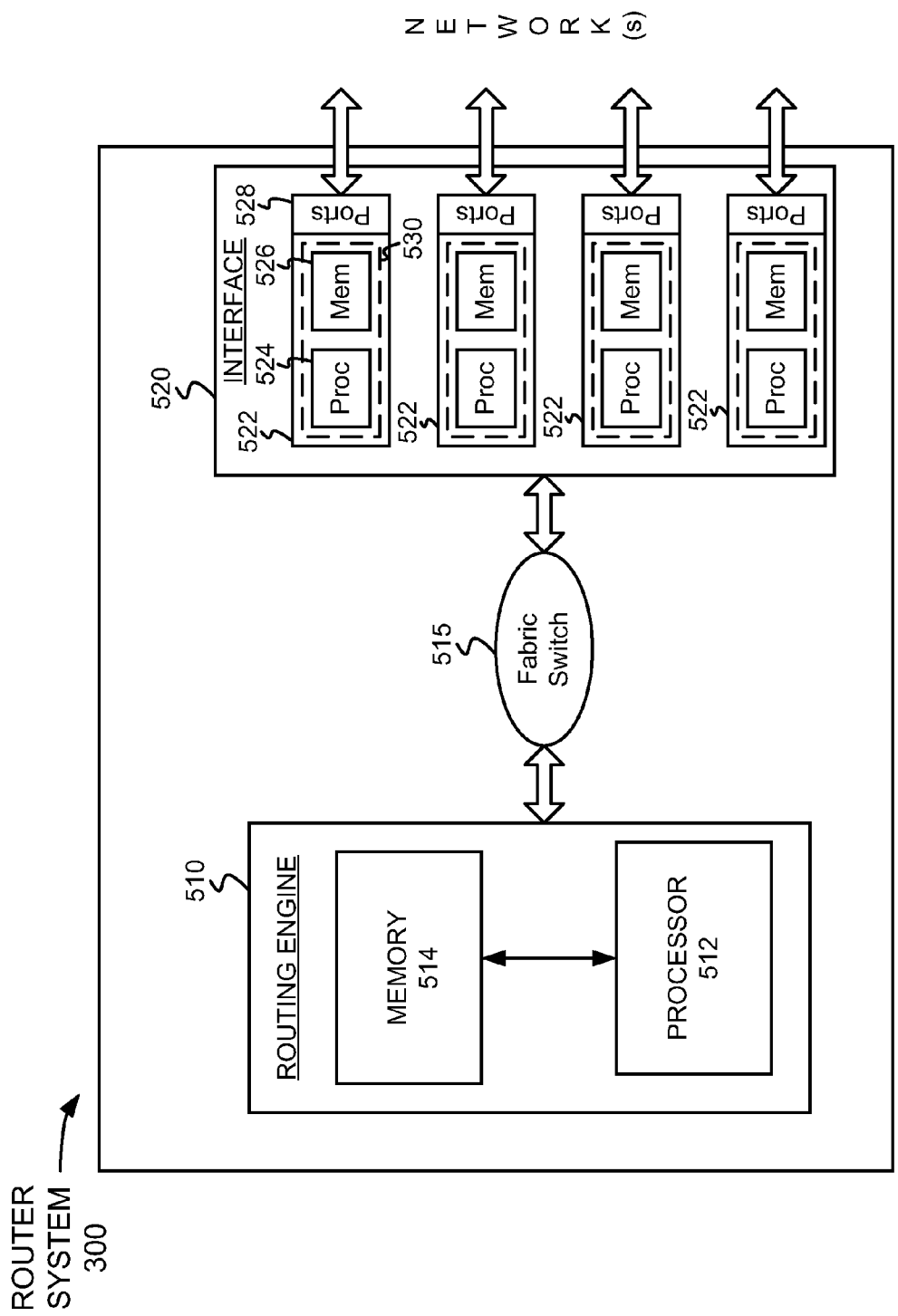
FIG. 5 illustrates an exemplary functional block diagram of the router system of FIGS. 3 and 4 in an implementation consistent with the present invention.

FIG. 5 is a block diagram illustrating a high-level layout of router system 300 (or router system 400). Router system 300 includes a routing engine 510, a fabric switch 515, and an interface 520.

Routing engine 510 includes memory 514 and processor 512. Processor 512 implements routing protocols (also called routing processes herein) that examine received network topology information and, based on the topology information, creates routing tables that reflect the topology of the network. Routing engine 510 may also generate forwarding tables based on the routing tables. The forwarding tables are transmitted to interface 520.

The memory 514 may include any type of conventional storage device. The memory 514 stores instructions and information that aids in the routing of packets in the network. The memory 514 may include one or more conventional databases. The memory 514 may also store one or more routing tables that allow for routing of received packets.

Fabric switch 515 provides a communication fabric between routing engine 510 and interface 520.

Interface 520 includes a number of line cards 522. Line cards 522 receive data at corresponding ports 528 from physical links connected to a network(s). Each physical link could be one of many types of transport media, such as optical fiber or Ethernet cable. Each line card may include a line card processor 524 and a line card memory 526. The line card processor 524 and memory 526 may be used to implement forwarding engine 530 for the line card 522. In general, forwarding engine 530 directs and transmits incoming and outgoing packets in interface 520. Memory 526 may store the forwarding tables transmitted from routing engine 510 over fabric switch 515. Line card processor 524 uses its forwarding table, stored in memory 526, when transmitting packets to fabric switch 515 and the external network(s).

Although processors 512 and 524 are illustrated in FIG. 5 as general purpose processors, the functionality implemented by processors 512 and 524 may be implemented in application-specific integrated circuits (ASICs). The ASICs may be configured to perform some processing via dedicated logic, and may also be configured to perform some processing using microcode instructions that may be stored in memory. Those skilled in the router art will appreciate that router system 300 might be practiced using a variety of hardware configurations in addition to, or instead of, ASICs.

Router System Resource Sharing

As previously mentioned, router systems 300 or 400 may share resources among the virtual routers of the router systems. The term "resources," as used herein, may refer to either logical or physical capabilities of the router system. Two logical resources will be considered: (a) routing processes and (b) forwarding processes. Additionally, two physical resources will be considered: (a) control resources and (b) data resources.

Routing processes refer to methods implemented by the router system in determining routing information for received packets. A routing process can include building routing tables and forwarding tables based on network topology information and based on the routing protocols being used.

Forwarding processes refer to methods implemented by the router system in actually forwarding the received packets to the appropriate destinations. These methods include examining packet headers and applying forwarding tables to the packet headers to appropriately construct the packet that is to be transmitted.

Building routing and forwarding tables within a router, and using these table to appropriately route packets is generally well known in the art. Accordingly, further details of the routing and forwarding protocols will not be given herein.

The control resources refer to the physical incarnations of the routing and forwarding processes, such as the actual routing and forwarding table memories. The data resources, on the other hand, refer to physical specifications of the router system such as the number of ports, the port bandwidth, and the bandwidth of an internal fabric switch of the router system.

Router system 300 or 400, when implementing virtual routers, may implement the virtual routers by sharing resources across multiple virtual routers. By sharing resources, the router system 300 or 400 may more efficiently implement multiple virtual routers.

Various combinations of shared and non-shared resources may be implemented by router system 300 or 400. Possible combinations are shown in Table 1, below. In Table 1, RP stands for routing processes, FP stands for forwarding processes, CR stands for control resources, and DR stands for data resources.

TABLE 1

|  | RP(separate), FP(separate) | RP(separate), FP(shared) | RP(shared), FP(separate) | RP(shared), FP(shared) |
| --- | --- | --- | --- | --- |
| CR(separate), DR(separate) | State 1 | State 2 | State 3 | State 4 |
| CR(shared), DR(separate) | State 5 | State 6 | State 7 | State 8 |
| CR(separate), DR(shared) | State 9 | State 10 | State 11 | State 12 |
| CR(shared), DR(shared) | State 13 | State 14 | State 15 | State 16 |

Figure 6:
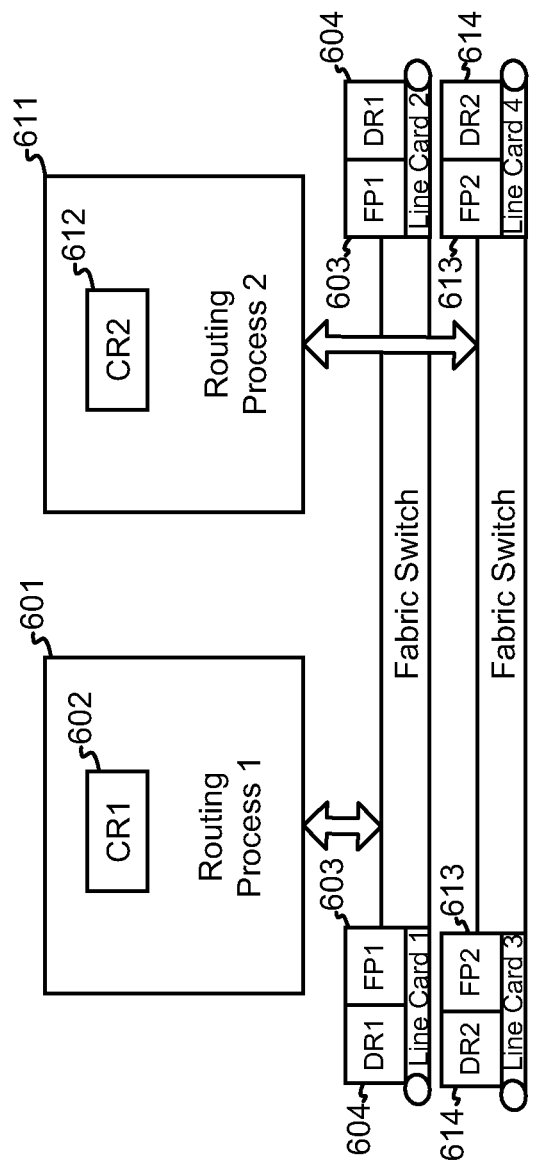
FIGS. 6-15 are diagrams illustrating resource allocations for various virtual router configurations.

FIG. 6 is a diagram conceptually illustrating resource allocation for virtual routers in which the router system allocates separate control resources, separate data resources, separate routing processes, and separate forwarding processes (state 1 in Table 1). Two exemplary virtual routers are shown in FIG. 6. The first virtual router includes a routing process 601 and control resources 602 (referred to collectively as the first virtual router's control plane). The control plane of the second virtual router includes a routing process 611 and corresponding control resources 612. The first virtual router additionally includes forwarding process 603 and data resources 604 (referred to collectively as the first virtual router's data plane). The data plane of the second virtual router includes forwarding process 613 and data resources 614. The data resources 604 and 614 may include, for example, the various port (interface) bandwidths and the switching fabric bandwidth.

In the scenario of FIG. 6, each virtual router acts as a standalone router because each router has a separate control and data plane. This can be advantageous, as it allows the virtual routers to share the same management plane and at the same time, due to the independence of the virtual routers, allows for a relatively high level of security.

Figure 7:
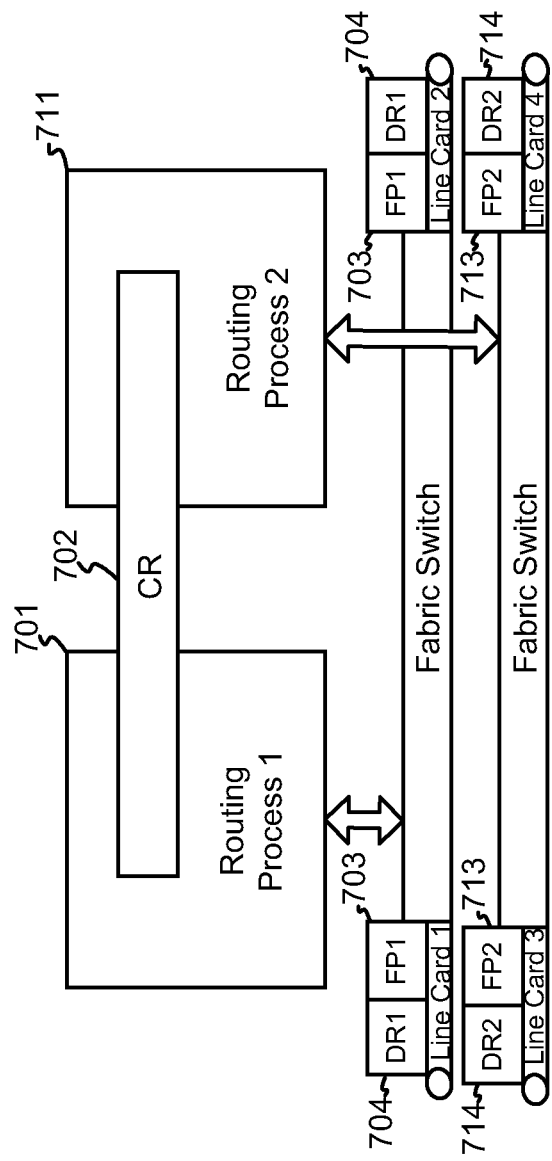

FIG. 7 is a diagram conceptually illustrating resource allocation for virtual routers in which the routing system allocates shared control resources, separate data resources, separate routing processes, and separate forwarding processes (state 5 in Table 1). As shown, two virtual routers share control resources 702. The virtual routers include separate routing processes 701 and 711. Additionally, the virtual routers include separate data planes. That is, the first virtual router includes forwarding process 703 and data resources 704, and the second virtual router includes forwarding process 713 and data resources 714.

The control resources, as previously mentioned, can include a routing table memory and/or forwarding table memories. Accordingly, in one implementation, the virtual routers in FIG. 7 may share a single routing table memory. The virtual routers may also share forwarding table memories. Typically, forwarding table memories are included in the line cards associated with each port of a router. Accordingly, it may be desirable to not share forwarding table memories between virtual routers having separate data planes.

Figure 8:
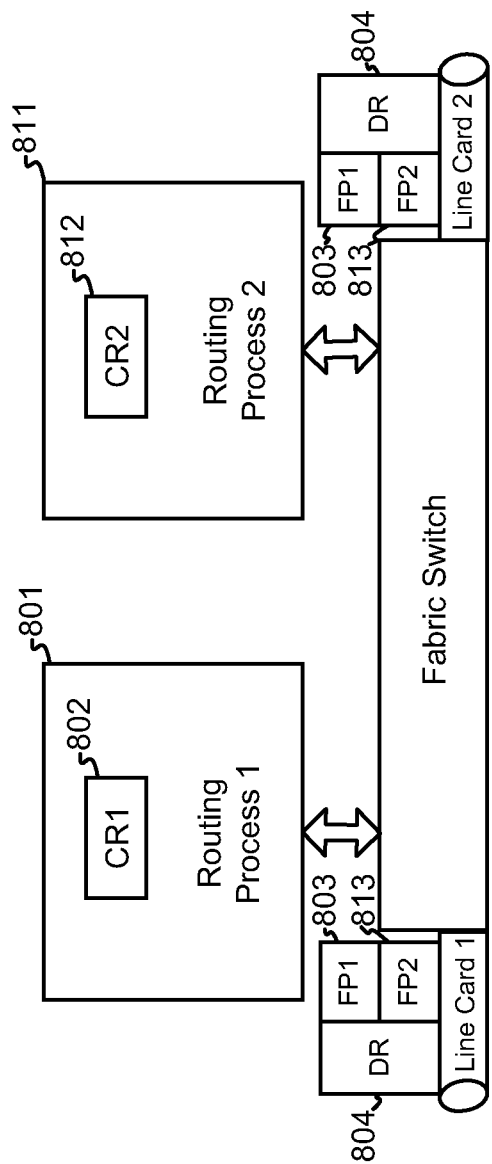

FIG. 8 is a diagram conceptually illustrating resource allocation for virtual routers in which the router system allocates separate control resources, shared data resources, separate routing processes, and separate forwarding processes (state 9 in Table 1). The two virtual routers shown in FIG. 8 share a single data resource 804, which may include the fabric switch and/or the router ports. Further, the first virtual router includes routing processes 801, control resources 802, and forwarding processes 803. The second virtual router includes routing processes 811, control resources 812, and forwarding processes 813.

Figure 9:
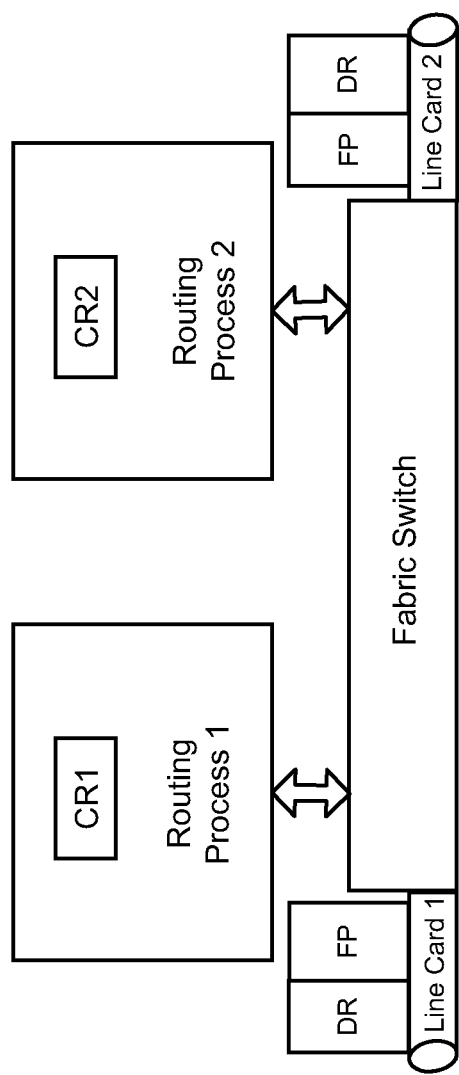

FIG. 9 is a diagram conceptually illustrating resource allocation for virtual routers in which the router system allocates separate control resources, shared data resources, separate routing processes, and shared forwarding processes (state 10 in Table 1). This embodiment of the virtual routers is similar to that shown in FIG. 8, except that the forwarding processes are also shared.

Figure 10:
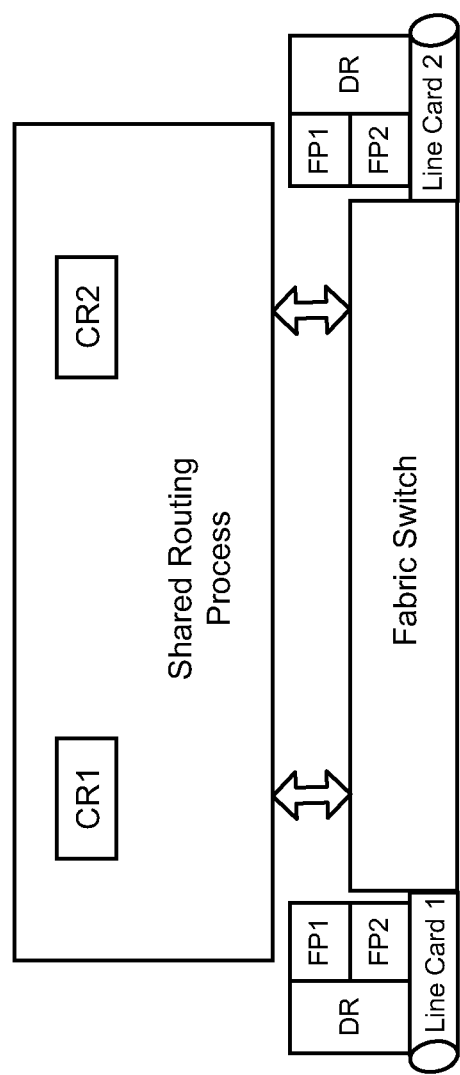

FIG. 10 is a diagram conceptually illustrating resource allocation for virtual routers in which the router system allocates separate control resources, shared data resources, shared routing processes, and separate forwarding processes (state 11 in Table 1). This embodiment of the virtual routers is similar to that shown in FIG. 8, except that the routing processes are also shared.

Figure 11:
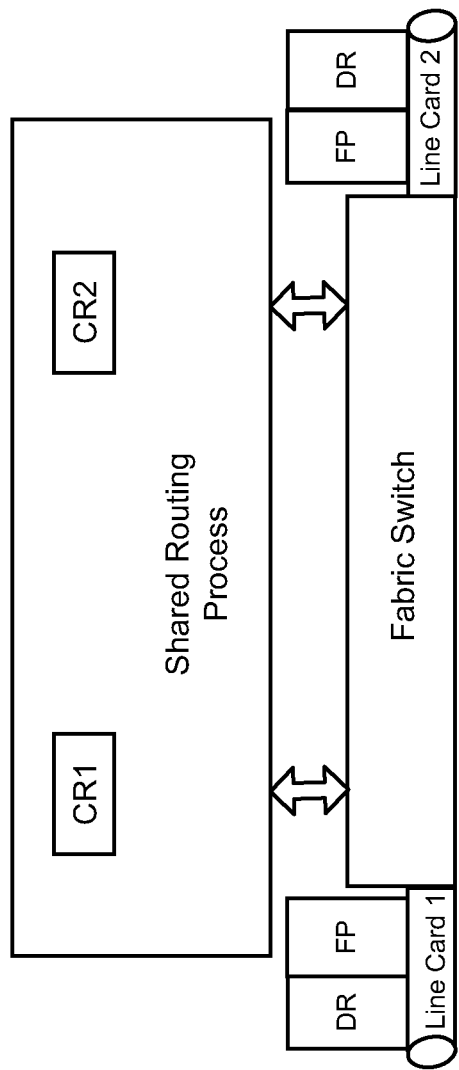

FIG. 11 is a diagram conceptually illustrating resource allocation for virtual routers in which the router system allocates separate control resources, shared data resources, shared routing processes, and shared forwarding processes (state 12 in Table 1). This embodiment of the virtual routers is similar to that shown in FIG. 8, except that the routing processes and forwarding processes are shared.

Figure 12:
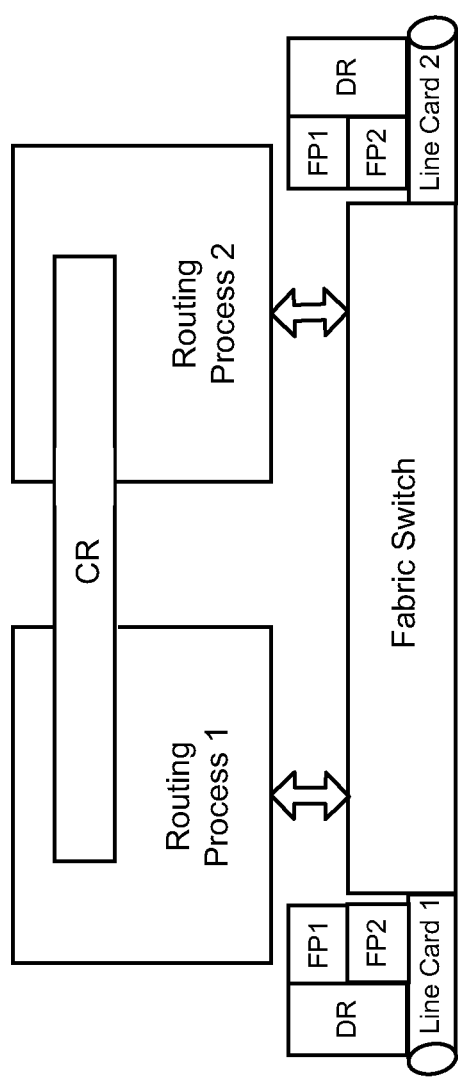

FIG. 12 is a diagram conceptually illustrating resource allocation for virtual routers in which the router system allocates shared control resources, shared data resources, separate routing processes, and separate forwarding processes (state 13 in Table 1). The data resources that are shared may include sharing of the fabric switch, sharing of the port bandwidth, or sharing of both the fabric switch and the port bandwidth. The control resources that are shared may include sharing of the routing table memory, sharing of forwarding table memories, or sharing of both the routing and forwarding table memories.

Figure 13:
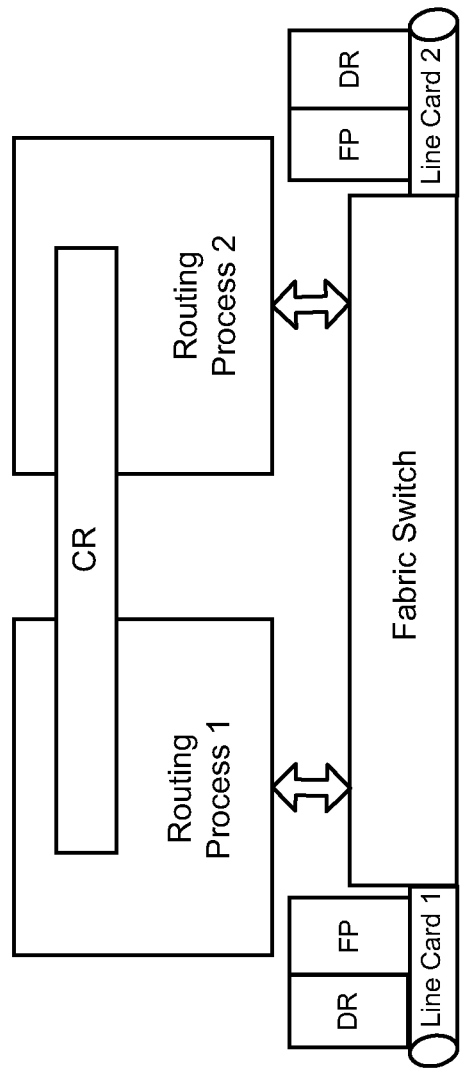

FIG. 13 is a diagram conceptually illustrating resource allocation for virtual routers in which the router system allocates shared control resources, shared data resources, separate routing processes, and shared forwarding processes (state 14 in Table 1). This embodiment of the virtual routers is similar to that shown in FIG. 12, except that the virtual routers additionally share a forwarding process.

Figure 14:
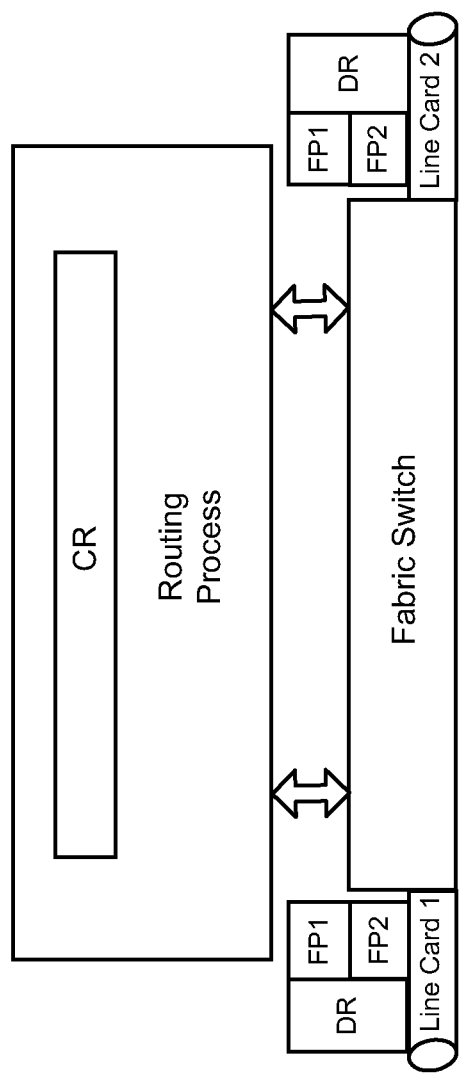

FIG. 14 is a diagram conceptually illustrating resource allocation for virtual routers in which the router system allocates shared control resources, shared data resources, shared routing processes, and separate forwarding processes (state 15 in Table 1). This embodiment of the virtual routers is similar to that shown in FIG. 8, except that the virtual routers additionally share a routing process.

Figure 15:
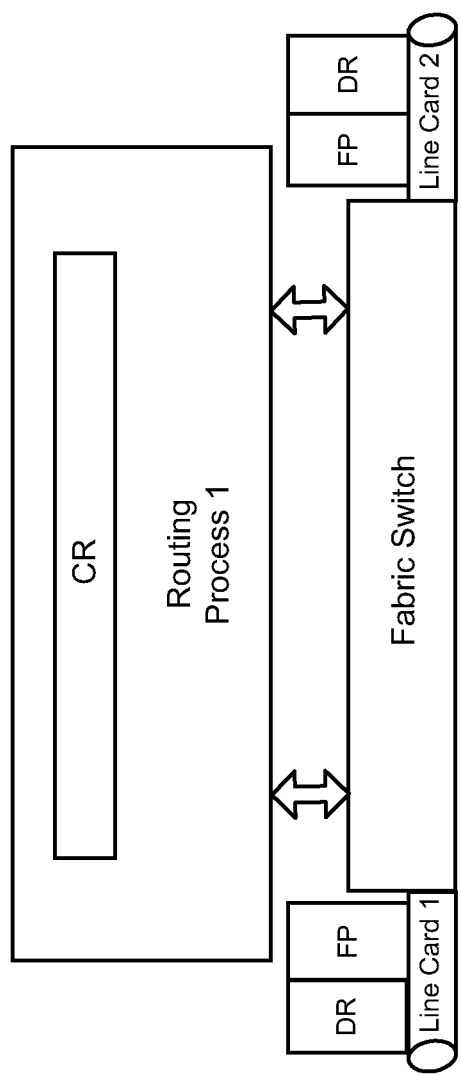

FIG. 15 is a diagram conceptually illustrating resource allocation for virtual routers in which the routing system allocates shared control resources, shared data resources, shared routing processes, and shared forwarding processes (state 16 in Table 1). This embodiment of the virtual routers is similar to that shown in FIG. 8, except that the virtual routers additionally share a routing process and a forwarding process.

A number of possible resource sharing configurations have been described above in reference to FIGS. 6-15. Router system 300/400 may use these various resource sharing configurations to implement collections of virtual routers, such as the virtual router shown in FIGS. 3 and 4. In one embodiment, router system 300/400 may be programmably modified by a user to implement different ones of the resource sharing configurations shown in FIGS. 6-15.

Specific hardware implementations of virtual routers are discussed in copending, commonly assigned U.S. patent application Ser. No. 10/085,031, filed Mar. 1, 2003 and entitled, "Systems And Methods For Implementing a Virtual Router," the contents of which are incorporated in their entirety herein.

Virtual router configurations corresponding to a number of the states shown in Table 1 have been discussed in detail. One of ordinary skill in the art will recognize, however, that virtual routers having configurations shown in Table 1 but not explicitly discussed above could also be implemented.

CONCLUSION

Systems and methods, consistent with the present invention, provide a routing system that implements virtual routers. The virtual routers of the routing system functionally act, from the standpoint of an external device, as independent routers. The routing system may share resources in implementing the virtual routers. The configuration of the shared resources may be user programmable.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention.

It will be appreciated that the present invention can be implemented in hardware, software, or a combination of hardware and software. Thus, the present invention is not limited to any specific combination of hardware circuitry and software.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed:

1. A method comprising:
    allocating, by a processor of a single device, a set of logical resources between a plurality of virtual routers implemented in the single device;
    allocating, by the processor of the single device, a set of physical resources between the plurality of virtual routers implemented in the single device; and
    specifying, by the processor of the single device and based on a plurality of resource sharing configurations that specify different sets of network requirements, logical resources, of the set of logical resources, and physical resources, of the set of physical resources, that are to be shared between the plurality of virtual routers.

2. The method of claim 1, where allocating the set of logical resources comprises:
    allocating one or more routing processes to route received data packets.

3. The method of claim 1, where allocating the set of logical resources comprises:
    allocating one or more forwarding processes associated with forwarding a received data packet to a destination associated with the received data packet.

4. The method of claim 1, where allocating the set of logical resources comprises:
    allocating one or more control resources associated with at least one routing table associated with the single device.

5. The method of claim 1, where allocating the set of logical resources comprises:
    allocating one or more data resources associated with at least one physical specification of the single device.

6. The method of claim 5, where the at least one physical specification of the single device includes at least one of:
    a number of ports of the single device,
    a port bandwidth of the single device, or
    a bandwidth of an internal fabric switch of the single device.

7. The method of claim 1, where the plurality of resource sharing configurations are reconfigurable by a user.

8. A routing system, comprising:
    a single device that implements a plurality of virtual routers,
    the single device being implemented at least partially in hardware, and
    the single device including:
        a set of logical resources between the plurality of virtual routers implemented by the single device; and
        a set of physical resources between the plurality of virtual routers implemented by the single device,
            a plurality of resource sharing configurations specifying different sets of network requirements that specify logical resources, of the set of logical resources, and physical resources, of the set of physical resources, that are to be shared between the plurality of virtual routers.

9. The routing system of claim 8, where the set of logical resources comprises:
    one or more routing processes to route received data packets.

10. The routing system of claim 8, where the set of logical resources comprises:

one or more forwarding processes associated with forwarding a received data packet to a destination associated with the received data packet.

11. The routing system of claim 8, where the set of physical resources further comprises:
one or more control resources associated with at least one routing table associated with the single device.

12. The routing system of claim 8, where the set of physical resources further comprises:
one or more data resources associated with at least one physical specification of the single device.

13. The routing system of claim 12, where the at least one physical specification of the single device includes at least one of:
a number of ports of the single device,
a port bandwidth of the single device, or
a bandwidth of an internal fabric switch of the single device.

14. The routing system of claim 8, where the plurality of resource sharing configurations are reconfigurable by a user.

15. A network point-of-presence (POP) device comprising:
a single physical router including a plurality of resources,
the single physical router being implemented at least partially in hardware, and the plurality of resources including:
logical resources, and
physical resources,
the single physical router further including:
at least one backbone router, implemented as a virtual router by the single physical router, at an end-point of a high capacity network link, and
at least one regional router implemented as a virtual router by the single physical router,
the at least one backbone router and the at least one regional router sharing resources, of the single physical router, based on a plurality of resource sharing configurations that reconfigurably specifies different sets of network requirements that specify logical resources and physical resources that are to be shared between the backbone router and the regional router.

16. The network POP device of claim 15, where the logical resources include:
routing processes to determine routing for received packets; and
forwarding processes to forward the received packets to an appropriate destination.

17. The network POP device of claim 15, where the physical resources include:
control resources, including a routing table; and
data resources associated with at least one physical specification of the single physical router.

18. The network POP device of claim 17, where the control resources further include a forwarding table.

19. The network POP device of claim 17, where the at least one physical specification includes:
a number of ports of the single physical router,
a port bandwidth of the single physical router, or
a bandwidth of an internal fabric switch of the single physical router.

20. The network POP device of claim 15, where the plurality of resource sharing configurations are reconfigurable by a user.

* * * * *